United States Patent Office 3,448,196
Patented June 3, 1969

3,448,196
METHOD AND COMPOSITION FOR INDUCING LOCAL ANESTHESIA WITH MONO-(BETA-DI-ETHYLAMINOETHYL)AMIDE OF PARACHLO-ROPHENOXYACETIC ACID
Paul Rumpf and Germaine Thuillier born Nachmias, Paris, France, assignors to Etablissement Public: Centre National de la Recherche Scientifique, Paris, France, a corporation of France
No Drawing. Continuation-in-part of application Ser. No. 21,606, Apr. 12, 1960. This application Sept. 16, 1964, Ser. No. 397,009
Claims priority, application France, Apr. 15, 1959, 792,163; July 30, 1959, 801,561
Int. Cl. A61k 27/00; A61m 19/00; C07c 13/30
U.S. Cl. 424—324                    2 Claims This application is a continuation-in-part of our previous application Ser. No. 21,606 filed Apr. 12, 1960, now abandoned.

This invention relates to novel basic aminoalcoylamides having a tertiary amide function, derived from acids having plant growth properties. These aminoalcoylamides are mono-(beta-diethylaminoethyl)amide of parachlorophenoxyacetic acid, mono-(beta-diethylaminoethyl)amide of parabromophenoxyacetic acid, mono-(gamma-diethylaminopropyl)amide of parachlorophenoxyacetic acid, mono-(beta-diethylaminoethyl)amide of methyl-2 chloro-4 phenoxyacetic acid, mono-(beta-diethylaminoethyl)-amide of dichloro-2,4 phenoxyacetic acid and their pharmaceutically acceptable acid addition salts. These compounds have valuable therapeutic properties as local anaesthetics in animals. Said amides correspond to the general formula:

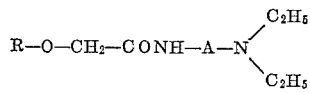

where A=ethylene or propylene groups and R is a member selected from the group consisting of para-chloro phenyl, para-bromo phenyl, and ortho-chloro and ortho methyl derivatives thereof.

The acid addition salts referred to are those obtained with the pharmaceutically acceptable acids especially acids of low molecular mass, such as hydrochloric acid, carboxylic acids of the aliphatic series having from 2 to 6 carbon atoms, including isobutyric acid, diethylacetic acid, fumaric acid, maleic acid, oxalic acid, citric acid, lactic acid, tartaric acid, ethan-disulfonic acid, and further phenylpropionic acid, phenyl-butyl-acetic acid, p-acet-amido-benzoic acid, nicotinic acid, and other organic acids.

Within the class of aminoalcoylamides of the invention specified above, of especial advantage are the diethylamino-ethylamides and the diethylaminopropylamides of phenoxyacetic acid and its nuclear-substituted derivatives (especially para-halophenoxyacetic acids, methyl-2 chloro-4 phenoxyacetic acid and dichloro-2,4 phenoxyacetic acid).

It has been found that the above specified amides, especially in the form of the salts specified above, are generally speaking possessed of high pharmacological activity, especially as local anaesthetics, and as having central nervous activity. In particular, the hydrochloride of p-chloro-phenoxy-N-diethylaminoethyl-acetamide has a local anaesthetic action substantially equal to that of "Xylocain," while having a substantially lower acute toxicity.

As compared to "Procain," in tests involving surface, conduction, and infiltration anaesthesia, the above substance when used in a 1% solution has shown itself to be at least twice as potent while being considerably less toxic. As a broad rule, the amides of the invention when injected parenterally are much less depressive in their action upon the arterial pressure and respiration than is Procain.

They may be used in from 1 to 3% solution in physiological serum, possibly in admixture with vasoconstrictor agents. When sterilized at 100° C. for 35 minutes their activity is unmodified.

Besides said strong action on the peripheral nervous system just described, some of the amides produced according to the invention have further shown themselves as possessing marked stimulant effects on the central nervous system. Thus they act to potentialize the action of adrenalin applied to the cerebral cortex in the rabbit; they cause dilation of the chromatophores of *Phoxinus phoxinus* (Linn.) when immersed in an aqueous solution of the amide, in a ratio within the range from 0.25 to 1 pro mil.

According to the invention, a method of preparing the above amides comprises reacting, in an anhydrous medium or eventually in aqueous medium, a halide, especially the chloride, of an acid, with a diamine having both a primary and a tertiary amine functions whereby the molar ratio of the halide to the diamine may be 1 to 2 or 1 to 1 according as it is desired to produce the free basic amide, or a salt thereof. Where the ratio used is 1 to 2, diamine hydrochloride is formed simultaneously with the amide, and may be separated from the reaction medium so that the amide may later be isolated.

Addition salts of the amides with acids may be prepared by reacting the selected acid with the basic amide in equivalent ratio.

A few examples of practical procedures used in preparing products according to the invention are described hereinafter for purposes of illustration but not of limitation.

EXAMPLE 1

205 g. (1 mole) of p-chloro-phenoxyacetic acid chloride were dissolved in 600 cc. chloroform, and separately 88 g. (1 mole) of N,N-dimethylethylenediamine were dissolved in 300 cc. of the same solvent. The latter solution was poured into the former and the mixture was allowed to stand 48 hours at 20° C. The hydrochloride of p-chloro-phenoxyacetic acid mono-(beta-dimethylamino-ethyl) amide precipitated. It was drained and recrystallized from absolute ethyl alcohol. The melting point was 121° C.

Using a similar procedure, the beta-dimethylamino-ethylamide hydrochlorides of yet other acids may be prepared. If the proportion of dimethylethylenediamine is doubled, a precipitate of the hydrochloride of the diamine is first produced. When this has been removed by draining, the solvent can be distilled out of the filtrate to isolate the basic monoamide which can then be converted into a salt by reacting it with any of the above indicated acids.

EXAMPLE 2

205 g. (1 mole) of parachloro-phenoxyacetic acid chloride were dissolved in 700 cc. ethyl acetate, and separately 116 g. (1 mole) of N,N-diethylethylenediamine were dissolved in 400 cc. of the same solvent. The latter solution was poured into the former with mechanical stirring and the mixture was cooled to 0° C. The para-chlorophenoxyacetic acid mono-(beta-diethylaminoethyl) amide hydrochloride precipitated, was drained and recrystallized from acetone. The melting point was 119° C.

If in the above process the N,N-diethylethylenediamine is replaced with an equimolar quantity of N,N-dimethyl-propylenediamine-1,3, the resulting hydrochloride had a melting point of 159° C. With N,N-diethylpropylene-diamine-1,3, the corresponding hydrochloride which is highly hygroscopic, did not crystallize. The free base has a melting point of 45° C.

Using the same procedure, the hydrochlorides of amino-amides of other acids may be prepared.

EXAMPLE 3

116 g. (1 mole) N,N-diethylethylenediamine were dissolved in 1 liter water, and 205 g. (1 mole) parachlorophenoxyacetic acid chloride were added while stirring mechanically and maintaining a temperature lower than 50 °C. The solution rapidly became homogeneous. Agitation of the reaction mixture was continued for 2 hours at about 20° C. in order to complete the initial formation of the basic amide hydrochloride. Soda lye was added in excess and the basic amide that formed was extracted with ether. The ether solution was dried over anhydrous sodium sulfate and a stream of hydrochloric acid gas was discharged to precipitate the para-chlorophenoxyacetic acid mono-(beta-diethylaminoethyl)amide hydrochloride. This was drained and recrystallized from anhydrous isopropanol. The yield was 80% of theoretical; the resulting salt had a melting point of 119° C.

Alternatively, instead of isolating the basic amide, the aqueous solution in which the hydrochloride has formed may be evaporated under a pressure of 20 mm. Hg. until the anhydrous hydrochloride is obtained, and this may then be purified by recrystallization as described above.

A compound is already known from Kurihara (Chemical Abstracts, vol. 53–page 10,142). Said compound is (n° XVIII) an orthohalogenphenoxyacetic compound. The indications given by Kurihara are that said compound XVIII has no local anesthetic activity. That can be explained by the fact that the para position of the halogen is a critical one according to the invention, to obtain the specific properties offered by the compound of the invention, i.e., a local anesthetic property and a central nervous activity.

Tests have been made on the compounds according to the invention and are reported as follows by the author thereof.

LOCAL ANAESTHETIC ACTIVITY

I. Diethylaminoethylamide of p. chlorophenoxyacetic acid (the compound is called "ANP 246").

(a) The local anaesthetic properties of ANP 246 appear clearly from tests which have been made on the rabbit cornea, from testing the conduction anaesthesia and the infiltration anaesthesia.

The toxicity of the compound, by intravenous method, for the mouse, is about 250 mg./kg. The time for which insensitization is maintained, is about 28 minutes in a 1% physiological salt solution. No irritation has been observed.

(b) ANP 246 has been used in human medicine and various observations are detailed hereafter on patients submitted to operation with local anaesthesia through ANP 246.

(1) By using 1% solution of ANP 246 in physiological salt solution, tracheotomies have been executed under local anaesthesia with respective volumes of 12 ml. and 15 ml. of the solution. The anaesthesia was sufficient, the tissular tolerance was good, and cicatrization was a normal one.

(2) Six scalpings before operation have been performed with local anaesthesia through 40 ml. of a 1% solution of ANP #246 in physiological salt solution. The cicatrization of the wounds was normal.

(3) The amputation of a finger was made under local anaesthesia through 10 ml. of a one percent solution of ANP 246 in physiological salt solution (called "serum"). Correct and normal cicatrization.

(4) The operation of an ingrowing nail of the big toe has been possible under local anaesthesia through 10 ml. of a 1% solution of ANP 246 in serum.

(5) To set fracture of metacarpus, an intra-articular injection was realized at the point of the fracture with 5 ml. of a 2% solution of ANP 246 in serum. The setting has taken place without pain.

(6) An epigastric hernia has been operated under local anaesthesia through 20 ml. of a 2% solution of ANP 246 in serum. The anaesthesia was excellent and the cicatrization perfect.

II. Diethylaminoethylamide of p. bromophenoxyacetic acid.

According to experiments and tests made as above, the toxicity of this compound appears to be greater than that of ANP 246; for the mouse from about 125 to 200 mg./kg. Its activity, however, is far greater than for ANP 246, in similar proportions to the toxicity, as is the case for ANP 246. For the mouse, maintenance of insensitization for about 20 minutes with a 0.5 solution of compound.

III. The compounds above have the advantage of permitting a choice, in each case, between a more or less rapid local anaesthetic, both being non-toxic and non-irritating under the conditions of use.

Thus the diethylaminoethylic amide of parachlorophenoxyacetic acid (ANP 246) is a local anaesthetic remarkable for an activity similar to that of Lignocaine, but with a toxicity considerably weaker.

In addition to this activity as a local anaesthetic, the product essentially distinguishes itself from many other local anaesthetics by its properties with regard to the central nervous system.

CENTRAL NERVOUS SYSTEM ACTIVITY

A number of tests performed on animals are set forth as follows:

(a) The effect of ANP 246 on spontaneous activity (Experiments performed on groups of ten animals)

After initial depression on mice and rats, never going as far as sleep, doses greater than 75 mg./kg., administered by intraperitoneal injection, cause slow extension of the four legs of mice, accompanied by tremors and hypotonicity.

On rabbits, an intravenous perfusion of a 0.5% solution at the rate of 0.5 ml. per minute produced no observable change of the overall behaviour, but there were fits of chewing and licking.

(b) Experimental sleep

The oral administration of 100 mg./kg. of ANP 246 on groups of ten mice reinforces the narcosis induced by the barbiturates, ethanol and diethylamide of eugenolglycolic acid, in particular. The sleep induced by a 50 mg./kg. intraperitoneal injection of the said diethylamide of eugenolglycolic acid, which normally lasts for five minutes, is increased to 14 minutes after administration of ANP 246 (100 mg./kg. orally).

(c) Effect against Reserpine
(Anti-Reserpine effects)

(1) ANP 246 opposes lowering of the convulsion threshold of Bemegride by Reserpine. Thus, with rabbits treated intravenously with 2.5 mg./kg. of Reserpine, Bemegride causes convulsions with a dose of 6 mg./kg. administered intravenously as a 0.5% solution of the rate of 0.5 ml. per minute. If 20 mg./kg. of ANP 246 are administered intravenously 15 minutes before injecting Bemegride, 14 mg./kg. of Bemegride are required to cause convulsions.

This latter dose, however, is the very amount required to induce convulsions in animals NOT treated with Reserpine.

In conclusion, ANP 246 consequently suppresses the effect of Reserpine.

(2) One of the tests most frequently used to demonstrate the anti-depressive effect of certain substances is the suppression, by chemical molecules, of ptosis caused by Reserpine.

As an example, there is mentioned the instance of Imipramine (Tofranil), which suppresses falling of the eyelids caused by Reserpine in rabbits.

ANP 246 in a dose of 5 mg./kg. suppresses the ptosis caused by 2.5 mg./kg. of Reserpine (intravenous perfusion of a 1% solution).

For comparison, Tofranil produces similar results in a dose of 10 mg./kg.

If these two substances are compared, it is found that the effectiveness coefficient is in favor of ANP 246. Thus:

$$\text{For ANP 246, } \frac{DE}{DL} \times 100 = \frac{5}{125} \times 100 = 4$$

$$\text{For Tofranil, } \frac{DE}{DL} \times 100 = 15$$

Consequently, the effectiveness coefficient is 3.5 times higher than that of Tofranil.

(d) Other effects of ANP 246

ANP 246 reinforces the hyperthermia caused by diethylamide of lysergic acid.

It reduces tonus of the detached intestine of rats, guinea-pigs, and rabbits.

In intravenous injection it leads only to a moderate fall in pressure without notable change in the cardiac and respiratory rhythms.

THERAPEUTIC EFFECTS

It is known that some local anaesthetics sometimes have other therapeutic uses. These generally relate to using such anaesthetics in intravenous perfusions to reduce certain operative shocks.

What we claim is:
1. A method for inducing local anesthesia which comprises locally administering to a subject selected from the group consisting of animals and humans to be anesthetized an effective amount of a compound selected from the group consisting of mono - (beta - dimethylaminoethyl)-amide of parachlorophenoxyacetic acid and its non-toxic, pharmaceutically acceptable acid addition salts.

2. A pharmaceutical composition consisting essentially of a 0.5 to 3% physiological salt solution of a compound selected from the group consisting of mono-(beta-diethylaminoethyl)amide of parachlorophenoxyacetic acid and its pharmaceutically acceptable acid addition salts.

References Cited

UNITED STATES PATENTS

| 2,428,978 | 10/1947 | Martin | 260—473 |
| 2,715,645 | 8/1955 | Cusic | 260—559 |
| 2,766,173 | 10/1956 | Ziegler | 167—52 |
| 2,993,831 | 7/1961 | Shapiro | 167—52 |
| 3,141,757 | 7/1964 | Metivier | 260—559 |
| 3,168,561 | 2/1965 | Richter | 260—559 |

OTHER REFERENCES

Kurihara et al.: Chemical Abstracts 53; 10141(f), June 1959.

ALBERT T. MEYERS, *Primary Examiner.*

JEROME D. GOLDBERG, *Assistant Examiner.*

U.S. Cl. X.R.

260—559